United States Patent
Gustafsson et al.

(10) Patent No.: US 11,108,508 B2
(45) Date of Patent: Aug. 31, 2021

(54) APPLYING MORE ROBUST TRANSMISSION PROCEDURE

(71) Applicant: Telefonaktiebolaget LM Ericsson (publ), Stockholm (SE)

(72) Inventors: Christer Gustafsson, Huddinge (SE); Carola Faronius, Järfälla (SE); Anders Ohlsson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 344 days.

(21) Appl. No.: 16/094,602

(22) PCT Filed: Apr. 19, 2016

(86) PCT No.: PCT/SE2016/050340
§ 371 (c)(1),
(2) Date: Oct. 18, 2018

(87) PCT Pub. No.: WO2017/184039
PCT Pub. Date: Oct. 26, 2017

(65) Prior Publication Data
US 2020/0328846 A1 Oct. 15, 2020

(51) Int. Cl.
*H04L 1/18* (2006.01)
*H04W 76/28* (2018.01)
(Continued)

(52) U.S. Cl.
CPC ......... *H04L 1/189* (2013.01); *H04W 52/0216* (2013.01); *H04W 72/042* (2013.01); *H04W 76/28* (2018.02)

(58) Field of Classification Search
CPC ............. H04L 1/189; H04W 52/0216; H04W 72/042; H04W 76/28
See application file for complete search history.

(56) References Cited

U.S. PATENT DOCUMENTS 8,792,434 B2 * 7/2014 Hedlund ............... H04L 5/0053
370/329
9,161,354 B2 * 10/2015 Papasakellariou .... H04L 5/0053
(Continued)

FOREIGN PATENT DOCUMENTS

CN 102378255 A * 3/2012 ............ H04W 72/04
CN 102892186 A * 1/2013 ........... H04L 1/1825
(Continued)

OTHER PUBLICATIONS

PCT International Search Report for International application No. PCT/SE2016/050340—dated Jan. 23, 2017.
(Continued)

*Primary Examiner* — Eric Nowlin
(74) *Attorney, Agent, or Firm* — Baker Betts, LLP

(57) ABSTRACT

It is provided a method performed in a network node of a cellular network also comprising a wireless device, the wireless device being in a discontinuous reception mode comprising receiving periods and idle periods. The method comprises the steps of: transmitting a first control signal to the wireless device during a receiving period for the wireless device; determining that a first control signal is likely to have failed to be correctly received by the wireless device; determining that a second control signal needs to be transmitted to the wireless device, the second control signal corresponding to the first control signal; applying a more robust transmission procedure for the second control signal compared to a corresponding transmission procedure for the first control signal; and transmitting the second control signal to the wireless device.

17 Claims, 3 Drawing Sheets

(51) Int. Cl.
*H04W 52/02* (2009.01)
*H04W 72/04* (2009.01)

(56) References Cited

U.S. PATENT DOCUMENTS

| | | | | |
|---|---|---|---|---|
| 9,844,094 | B2* | 12/2017 | Lee | H04W 76/28 |
| 10,492,192 | B2* | 11/2019 | Liu | H04L 5/001 |
| 2008/0186893 | A1 | 8/2008 | Kolding et al. | |
| 2010/0265862 | A1* | 10/2010 | Choi | H04W 52/265 |
| | | | | 370/311 |
| 2011/0267967 | A1* | 11/2011 | Ratasuk | H04L 5/0053 |
| | | | | 370/252 |
| 2011/0280201 | A1* | 11/2011 | Luo | H04W 72/0406 |
| | | | | 370/329 |
| 2011/0305152 | A1* | 12/2011 | Ofuji | H04L 1/0026 |
| | | | | 370/252 |
| 2011/0310817 | A1* | 12/2011 | Okubo | H04L 5/0053 |
| | | | | 370/329 |
| 2012/0236813 | A1* | 9/2012 | Tan | H04L 5/001 |
| | | | | 370/329 |
| 2013/0308491 | A1* | 11/2013 | Jiang | H04W 52/24 |
| | | | | 370/252 |
| 2014/0064214 | A1* | 3/2014 | Papasakellariou | H04W 72/042 |
| | | | | 370/329 |
| 2014/0086110 | A1* | 3/2014 | Lee | H04J 3/14 |
| | | | | 370/280 |
| 2014/0314040 | A1* | 10/2014 | Wang | H04W 72/10 |
| | | | | 370/329 |
| 2015/0172022 | A1 | 6/2015 | Guo et al. | |
| 2015/0181534 | A1* | 6/2015 | Andersson | H04W 72/042 |
| | | | | 370/311 |
| 2016/0242161 | A1* | 8/2016 | Webb | H04L 1/0072 |
| 2017/0070979 | A1* | 3/2017 | Mirzaee | H04W 72/14 |
| 2018/0092068 | A1* | 3/2018 | Nammi | H04L 5/0053 |
| 2018/0199268 | A1* | 7/2018 | Wang | H04W 48/12 |
| 2018/0234224 | A1* | 8/2018 | Faronius | H04W 72/042 |
| 2018/0359017 | A1* | 12/2018 | Kwon | H04B 7/0689 |
| 2019/0166589 | A1* | 5/2019 | Yang | H04L 1/0061 |
| 2019/0306737 | A1* | 10/2019 | Kwak | H04L 5/0053 |
| 2020/0052857 | A1* | 2/2020 | Xu | H04L 5/0096 |

FOREIGN PATENT DOCUMENTS

| | | | | | |
|---|---|---|---|---|---|
| CN | 102378255 | B | * | 7/2014 | ............ H04W 72/04 |
| CN | 105101104 | A | * | 11/2015 | |
| CN | 105471560 | A | * | 4/2016 | |
| CN | 102892186 | B | * | 5/2017 | ............ H04W 72/04 |
| CN | 107645356 | A | * | 1/2018 | |
| CN | 105101104 | B | * | 1/2019 | |
| CN | 110166165 | A | * | 8/2019 | ............... H04L 1/00 |
| EP | 2 405 691 | A1 | | 1/2012 | |
| GB | 201811342 | | * | 8/2018 | ........... H04L 1/1896 |
| GB | 2575475 | A | * | 1/2020 | ........... H04L 1/1896 |
| JP | 5735178 | B2 | * | 6/2015 | ........... H04L 1/1621 |
| WO | 2009 022310 | A2 | | 2/2009 | |
| WO | 2009 033253 | A1 | | 3/2009 | |
| WO | 2009 116912 | A1 | | 9/2009 | |
| WO | WO-2012024869 | A1 | * | 3/2012 | ............ H04W 72/04 |
| WO | WO-2012155735 | A1 | * | 11/2012 | ............ H04W 52/48 |
| WO | 2015 016755 | A1 | | 2/2015 | |
| WO | 2015 16755 | A1 | | 2/2015 | |
| WO | 2015 140601 | A1 | | 9/2015 | |
| WO | WO-2019108623 | A1 | * | 6/2019 | ......... H04W 72/0446 |
| WO | WO-2019136689 | A1 | * | 7/2019 | ........... H04L 5/0053 |
| WO | WO-2019157914 | A1 | * | 8/2019 | ............... H04L 1/00 |

OTHER PUBLICATIONS

PCT Written Opinion of the International Searching Authority for International application No. PCT/SE2016/050340—dated Jan. 23, 2017.

3GPP TSG RAN WG2 Meeting #59bis; Shanghai, China; Benefits of HARQ Retransmission Being Handled Independently of DRX; Agenda Item 4.7.4 (R2-073997)—Oct. 8-12, 2007.

3GPP TSG-RAN WG2 meeting #59bis; Shanghai, China; Source: NXP Semiconductors, Philips; Title: Interactions between downlink HARQ and DRX (R2-074209)—Oct. 8-12, 2007.

3GPP TSG-RAN WG2 Meeting #82; Fukuoka, Japan; Source: Samsung; Title: MIMO and DRX operation on HARQ retransmission (R2-131829)—May 20-24, 2013.

* cited by examiner

APPLYING MORE ROBUST TRANSMISSION PROCEDURE

PRIORITY

This nonprovisional application is a U.S. National Stage Filing under 35 U.S.C. § 371 of International Patent Application Serial No. PCT/SE2016/050340 filed Apr. 19, 2016 and entitled "APPLYING MORE ROBUST TRANSMISSION PROCEDURE" which is hereby incorporated by reference in its entirety.

TECHNICAL FIELD

The invention relates to a method, a network node, a computer program and a computer program product for applying a more robust transmission procedure.

BACKGROUND

Cellular communication networks evolve towards higher data rates, together with improved capacity and coverage. In the 3rd Generation Partnership Project (3GPP) standardization body, several technologies have been and are also currently being developed.

LTE is a recent standardised technology. It uses an access technology based on OFDM (Orthogonal Frequency Division Multiplexing) for the downlink (DL) and Single Carrier FDMA (SC-FDMA) for the uplink (UL). The resource allocation to wireless devices on both DL and UL is performed adaptively by the concept of fast scheduling, taking into account the instantaneous traffic pattern and radio propagation characteristics of each wireless device. Assigning resources in both DL and UL is performed in the scheduler situated in a network node such as the radio base station.

In order to save power in wireless devices, DRX (Discontinuous Reception) can be used. A DRX cycle consists of a receiving period (also known as on duration) and an idle period (also known as off duration). No data can be received during the energy saving idle period, but only during the receiving period. This increases vulnerability since the opportunities of receiving control signals are reduced. Hence, any missed reception of a control signal can have large effects on user service quality.

SUMMARY

It is an object to reduce the effects of a control signal not being received properly.

According to a first aspect, it is provided a method performed in a network node of a cellular network also comprising a wireless device, the wireless device being in a discontinuous reception mode comprising receiving periods and idle periods. The method comprises the steps of: transmitting a first control signal to the wireless device during a receiving period for the wireless device; determining that a first control signal is likely to have failed to be correctly received by the wireless device; determining that a second control signal needs to be transmitted to the wireless device, the second control signal corresponding to the first control signal; applying a more robust transmission procedure for the second control signal compared to a corresponding transmission procedure for the first control signal; and transmitting the second control signal to the wireless device.

The step of applying a more robust transmission procedure may comprise using a Control Channel Element, CCE, aggregation level which is more robust.

Each one of the first control signal and the second control signal may be a downlink assignment or an uplink grant.

The step of applying a more robust transmission procedure may comprise using a Single Input Single Output, SISO, or Single Input Multiple Output, SIMO, transmission for the second control signal.

The step of applying a more robust transmission procedure may comprise selecting a Downlink Control Information, DCI, format which is more robust.

The step of applying a more robust transmission procedure may comprise selecting a DCI format 1A as defined in 3GPP TS 35.212 section 5.3.3 Each one of the first control signal and the second control signal may be a downlink assignment.

The step of transmitting the second control signal may in one embodiment only be performed when the wireless device is in a receiving period.

The step of determining that a first control signal is likely to have failed to be correctly received by the wireless device may comprise determining an absence of a signal from the wireless device being associated with the first control signal.

According to a second aspect, it is provided a network node configured to form part of a cellular network also comprising a wireless device, the wireless device being in a discontinuous reception mode comprising receiving periods and idle periods. The network node comprises: a processor; and a memory storing instructions that, when executed by the processor, causes the network node to: transmit a first control signal to the wireless device during a receiving period for the wireless device; determine that a first control signal is likely to have failed to be correctly received by the wireless device; determine that a second control signal needs to be transmitted to the wireless device, the second control signal corresponding to the first control signal; apply a more robust transmission procedure for the second control signal compared to a corresponding transmission procedure for the first control signal; and transmit the second control signal to the wireless device.

The instructions to apply a more robust transmission procedure may comprise instructions that, when executed by the processor, causes the network node to use a Control Channel Element, CCE, aggregation level which is more robust.

Each one of the first control signal and the second control signal may be a downlink assignment or an uplink grant.

The instructions to apply a more robust transmission procedure may comprise instructions that, when executed by the processor, causes the network node to use a Single Input Single Output, SISO, or Single Input Multiple Output, SIMO, transmission for the second control signal.

The instructions to apply a more robust transmission procedure may comprise instructions that, when executed by the processor, causes the network node to select a Downlink Control Information, DCI, format which is more robust.

The instructions to apply a more robust transmission procedure may comprise instructions that, when executed by the processor, causes the network node to select a DCI format 1A as defined in 3GPP TS 35.212 section 5.3.3.

Each one of the first control signal and the second control signal may be a downlink assignment.

The instructions to transmit the second control signal may in one embodiment only be performed when the wireless device is in a receiving period.

The instructions to determine that a first control signal is likely to have failed to be correctly received by the wireless device may comprise instructions that, when executed by the processor, causes the network node to determine an absence of a signal from the wireless device being associated with the first control signal.

According to a third aspect, it is provided a network node comprising: means for transmitting a first control signal to the wireless device during a receiving period for the wireless device, the wireless device forming part of a cellular network also comprising the network node, the wireless device being in a discontinuous reception mode comprising receiving periods and idle periods; means for determining that a first control signal is likely to have failed to be correctly received by the wireless device; means for determining that a second control signal needs to be transmitted to the wireless device, the second control signal corresponding to the first control signal; means for applying a more robust transmission procedure for the second control signal compared to a corresponding transmission procedure for the first control signal; and means for transmitting the second control signal to the wireless device.

According to a fourth aspect, it is provided a computer program comprising computer program code which, when run on a network node configured to form part of a cellular network also comprising a wireless device, the wireless device being in a discontinuous reception mode comprising receiving periods and idle periods, causes the network node to: transmit a first control signal to the wireless device during a receiving period for the wireless device; determine that a first control signal is likely to have failed to be correctly received by the wireless device; determine that a second control signal needs to be transmitted to the wireless device, the second control signal corresponding to the first control signal; apply a more robust transmission procedure for the second control signal compared to a corresponding transmission procedure for the first control signal; and transmit the second control signal to the wireless device.

According to a fifth aspect, it is provided a computer program product comprising a computer program according to the fourth aspect and a computer readable means on which the computer program is stored.

In this document, the following terms are used.

Cellular network is to be construed as a network comprising a plurality of radio cells for enabling mobile communication for a plurality of wireless devices.

Network node is to be construed as a node in a cellular network. The network node can e.g. be a radio base station.

Wireless device is to be construed as a user device which can be portable or fixed and can communicate over a wireless interface to a mobile communication network. Can e.g. be a mobile phone, smart phone or a tablet/laptop with wireless connectivity. The wireless device can also be referred to as User Equipment (UE).

Control signal is to be construed as a a signal not containing user data. The control signal can be used to control how the radio interface is used.

Robust transmission procedure is to be construed as a transmission procedure which can withstand a certain amount of negative radio interface influences, such as interference, noise, path loss, etc.

Control Channel Element (CCE) aggregation level is to be construed as how many CCEs which are used for a physical control channel element.

Downlink assignment is to be construed as an assignment of resources for user data transmitted in the downlink, i.e. from the network node to the wireless device.

Uplink grant is to be construed as an assignment of resources for user data transmitted in the uplink, i.e. from the wireless device to the network node.

Single Input Single Output (SISO): is to be construed as a transmission scheme between a transmitter equipped with a single antenna and a receiver equipped with a single antenna.

DCI format is to be construed as a definition of how control signals transmitted on the Physical Downlink Control Channel (PDCCH) are to be transmitted.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
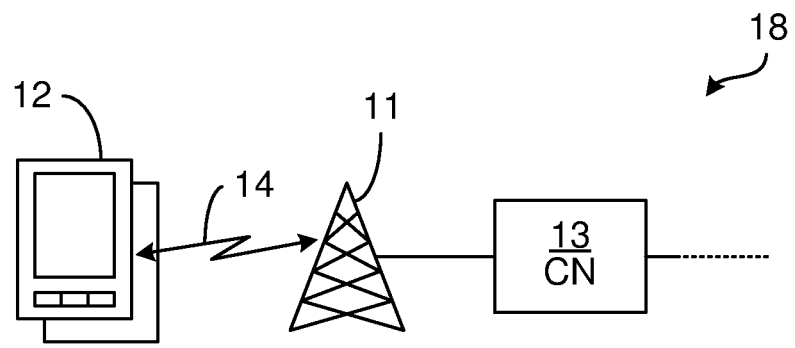
FIG. 1 is a schematic diagram illustrating a cellular network where embodiments presented herein may be applied.

FIG. 1 is a schematic diagram illustrating a cellular network 18 where embodiments presented herein may be applied. The cellular network 18 comprises a core network 13 and one or more network nodes 11, here in the form of radio base stations being evolved Node Bs, also known as eNode Bs or eNBs. The network node 11 could also be in the form of Node Bs, BTSs (Base Transceiver Stations) and/or BSSs (Base Station Subsystems), etc. The network node 11 provides radio connectivity to a plurality of wireless devices 12. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 18 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink communication (from the wireless device) and downlink communication (to the wireless device) between the wireless device 12 and the network node 11 occur over a wireless radio interface 14. The quality of the wireless radio interface 14 to each wireless device 12 can vary over time and depending on the position of the wireless device 12, due to effects such as fading, multipath propagation, interference, etc.

The network node 11 is also connected to the core network 13 for connectivity to central functions and a wide area network, such as the Internet.

Now, the concept of Voice over LTE (VoLTE), which can be applied in the cellular network 18, will be explained. In LTE, all packets are delivered using the IP protocol. This means that also services which traditionally have been circuit switched, such as conversational voice, will make use of fast scheduling and will be provided using Voice over IP (VoIP). In a typical VoIP arrangement, a voice encoder on the transmitter side encodes the speech into packets with the typical speech duration of 20 ms, mandated by GSMA IR.92. Voice over LTE (VoLTE) enables LTE networks to provide voice services. The mouth-to-ear delay introduced by the transport scheduling and transmission of the VoLTE packets is one of the main factors determining perceived speech quality. This causes a relatively tight delay budget for VoLTE to ensure good speech quality. The normal delay budget in the eNB is 80 ms, which provides a good speech quality. Hence, it is generally sufficient to schedule a VoLTE service once every 40 ms and bundle two packets. Such scheduling allows for a good balance between efficient usages of resources, good speech quality and enhanced battery performance.

When DRX is combined with VoLTE, the wireless device is configured to monitor the PDCCH during one or more subframes with a 40 ms period. Since speech packets are produced once every 20 ms, this DRX configuration allows for transmission of two speech packets every 40 ms.

The advantage of this configuration is that two packets are scheduled per scheduling opportunity, allowing efficient use of PDCCH (Physical Downlink Control Channel) and other scheduling resources, while the scheduling delay is still less than the delay budget. However, the tight delay budget of VoLTE does require that the wake period is utilised for scheduling of the VoIP packets that are available. If the opportunity is missed, an additional delay of 40 ms reduces the possibility to transmit the packets within the packet delay budget.

The VoLTE service is not only vulnerable to delays. Packet loss is even worse. The delays are handled fairly well by wireless device jitter buffers, while packet loss, especially of consecutive packets, significantly decreases the VoLTE quality, both perceived quality and objective quality, as defined by lower scores on the Mean Opinion Score (MOS) measurements using POLQA (Perceptual Objective Listening Quality Assessment).

Figure 2:
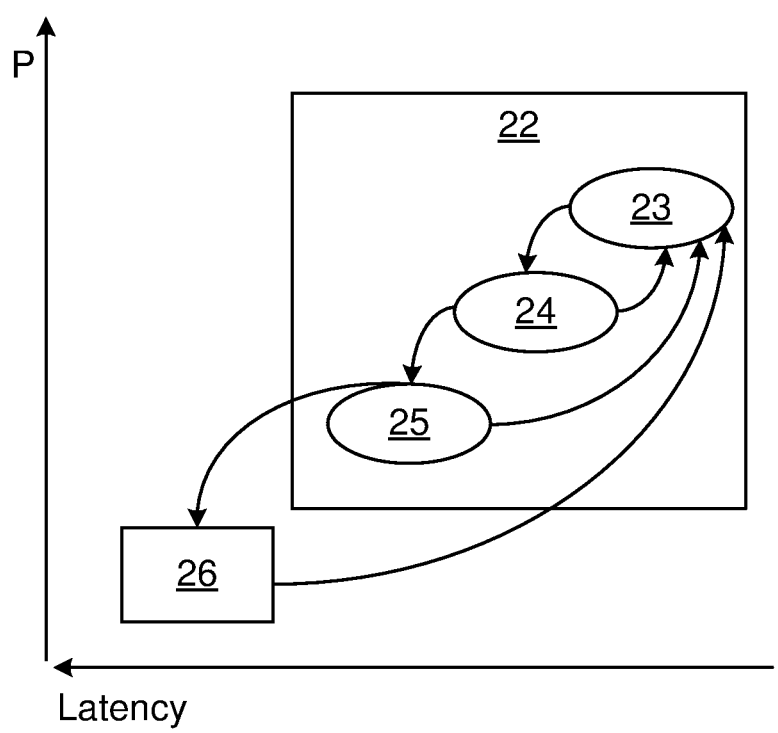
FIG. 2 is a state diagram illustrating various power states for a wireless device of FIG. 1 in a discontinuous reception mode.

POLQA covers a model to predict speech quality by means of digital speech signal analysis. The predictions of those objective measures should come as close as possible to subjective quality scores as obtained in subjective listening tests. Usually, a Mean Opinion Score (MOS) is predicted. POLQA uses real speech as a test stimulus for assessing telephony networks FIG. 2 is a state diagram illustrating various power states for a wireless device of FIG. 1 in a discontinuous reception mode. Each state uses an average power and involves an average latency for communication. In the diagram of FIG. 2, states further to the left involve a greater latency and states further up involve greater average power usage for the wireless device in question.

The states are used for Discontinuous Reception (DRX), which is a feature provided in LTE/E-UTRAN (Evolved UMTS (Universal Mobile Telecommunications System) Terrestrial Radio Access Network) for saving power in the wireless device, and thus reducing battery consumption. A DRX cycle consists of a receiving period of an on duration and an idle period of an off duration, with a combined period then being the on duration plus the off duration. No data can be received during the energy saving off duration, whereby the device is in a temporarily incommunicable state. If data is received in downlink during the on duration, the wireless device will stay awake and start an inactivity timer. As long as the inactivity timer has not expired, the wireless device is in a communicable state.

There are two main states shown in FIG. 2, an RRC_IDLE state 26 and an RRC_CONNECED state 22. In DRX, the RRC_CONNECTED state 22 comprises three individual states: a long DRX state 25, optionally a short DRX state 24 and a continuous reception state 23. The short DRX state 24 is optionally supported by the wireless device in question. The continuous reception state 23 is above the other states 24, 25, 26 in the diagram of FIG. 2, thereby using more power. Hence the power saving states 24, 25, 26 use progressively less power on average than the continuous reception state 23.

When in one of the long and short DRX states 24-25, the wireless device does not constantly monitor the PDCCH (Physical Downlink Control Channel), but only during specific receiving periods. During these states 24-25, the wireless device goes into power saving idle mode, being an off period, for part of the time, which decreases power consumption.

Hence, two DRX cycles can be set for each wireless device: a short DRX cycle for the short DRX state 24 and a long DRX cycle for the long DRX state 25. When the wireless device is in the continuous reception state 23, an inactivity timer is started after a PDCCH assignment/grant is received. When the inactivity timer expires, the wireless device switches to the long DRX state 25 unless short DRX is configured, in which case it first stays in the short DRX state 24 for a configurable amount of time. In the DRX states 24 and 25, the wireless device can only receive packets during the on duration.

From the RRC_IDLE state 26, a random access procedure is required to get the wireless device back to the RRC_CONNECTED state 22 in general, and the continuous reception state 23 in particular.

There are a number of power state parameters that can be configured in the DRX state, such as on duration, the inactivity timer, the short DRX cycle timer, the long DRX cycle timer, the duration of the short DRX cycle, the duration of the long DRX cycle, retransmission timer, start offset, etc. These power state parameters can be configured for each wireless device separately and thus at least partly define when the wireless device is to be in an continuous reception state 23 or one of the power saving states 24, 25, 26. The retransmission timer parameter specifies the maximum number of consecutive PDCCH (Physical Downlink Control Channel) subframes the wireless device should remain active to be ready to receive an incoming retransmission after the first available retransmission time. The start offset parameter is an offset for each wireless device so that, in the time domain, not all wireless devices start receiving at the same time.

Figure 3:
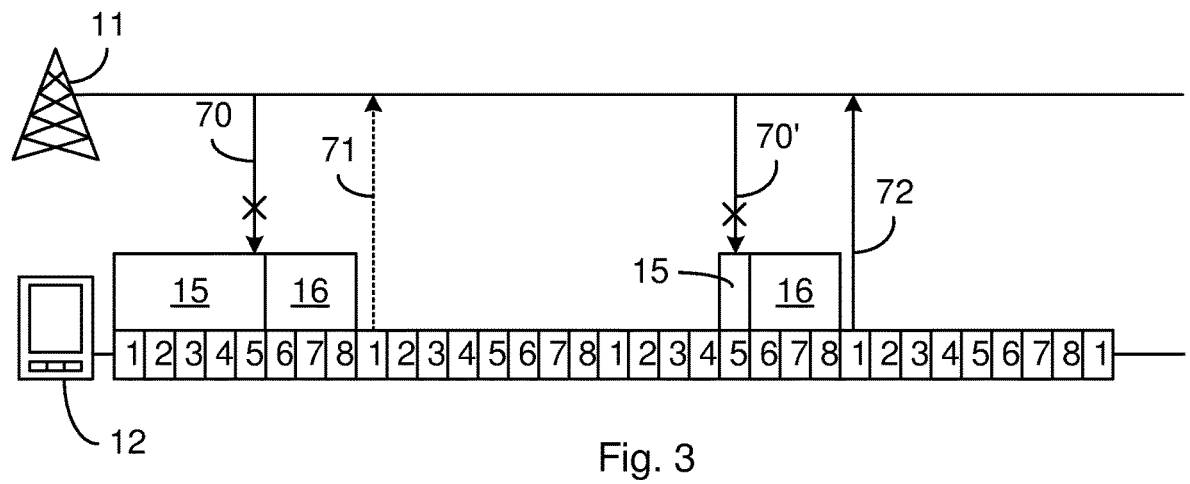
FIGS. 3-4 are schematic diagrams illustrating signalling between the network node and the wireless device of FIG. 1 according to various embodiments.

FIG. 3 is a schematic diagram illustrating signalling between the network node and the wireless device of FIG. 1 to illustrate one problem. Time proceeds from left to right. In the bottom section, HARQ process slots 1-8 are illustrated, representing respective HARQ processes. The HARQ process slots are repeated, and each HARQ process slot corresponds to a 1 ms subframe.

In this example, the network node 11 sends a first UL scheduling grant 70 over PDCCH in a HARQ process slot 5. For some reason, the wireless device 12 fails to receive the first UL scheduling grant 70, indicated by the cross on the arrow. This can e.g. be due to poor radio conditions, such as path loss, interference, etc.

The wireless device 12 is in DRX and is in the continuous reception state during an on-duration 15, where both the wireless device 12 and the network node 11 keeps track of corresponding inactivity timers for the particular wireless device. An inactivity timer 16 starts to supervise a switch from the continuous reception state 23 back to cyclic DRX on the network side after the first UL scheduling grant 70. But since the wireless device 12 did not receive the first UL scheduling grant, the wireless device does not start its corresponding inactivity timer.

In the idle period, there is no uplink transmission (which would occur if the UL scheduling grant would have been correctly received), whereby the network node 11 interprets the absence of uplink data as a first discontinuous transmission (DTX) 71a.

It is only during the next on-duration 15 that a second UL scheduling grant 70' can be received by the wireless device. However, the risk is very high that radio conditions have not improved dramatically in the time period from the first UL scheduling grant 70. Hence, it is likely that also the second UL scheduling grant 70' fails to be received by the wireless device. Due to the combination of DRX and failed control signal reception at the wireless device, the effects of the failed reception of control signals can have serious effects for user data transmissions to or from the wireless device.

Figure 4:
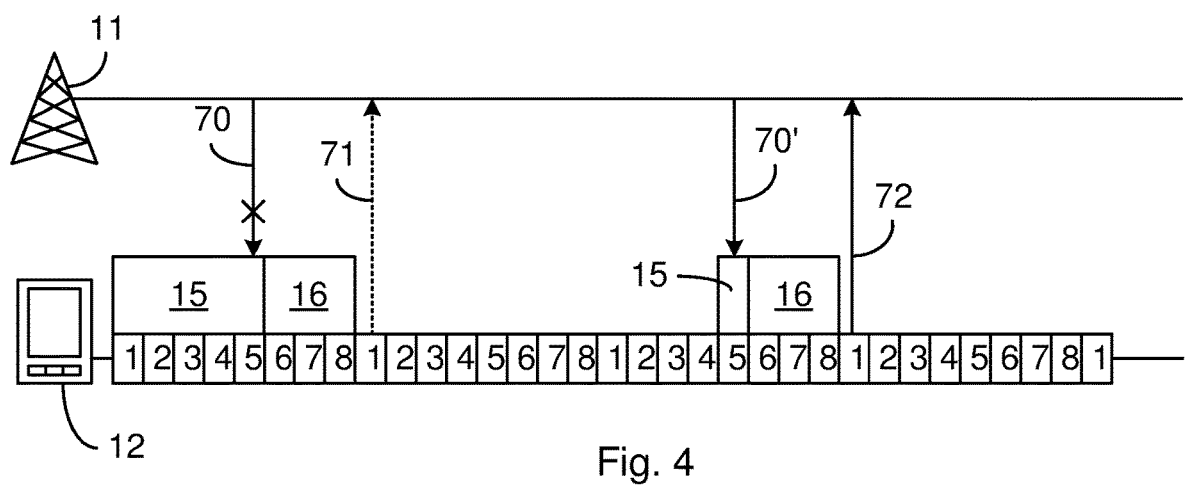

Looking now to FIG. 4, the initial UL scheduling grant 70 (in a first control signal), of a fifth HARQ process slot 5, is again not received by the wireless device 12. This results in the network node 11 interpreting a DTX 71.

The network node determines, from the DTX 71, that the first control signal is likely to have failed to be correctly received by the wireless device. In this embodiment, this results in the network node 11 applying a more robust transmission procedure for the second control signal comprising a new UL scheduling grant 70', being sent during the next on-duration 15.

By improving robustness for the second control signal, the wireless device 12 is more likely to correctly receive the second control signal, and thereby improve the chance of a successful associated data transfer. This is of particular use for real-time applications such as VoLTE, where any lost packets have a severe detrimental effect on perceived quality. Moreover, particularly when DRX is employed, it is of great importance to improve the chances of successful transmission of the second control signal.

Figure 5:
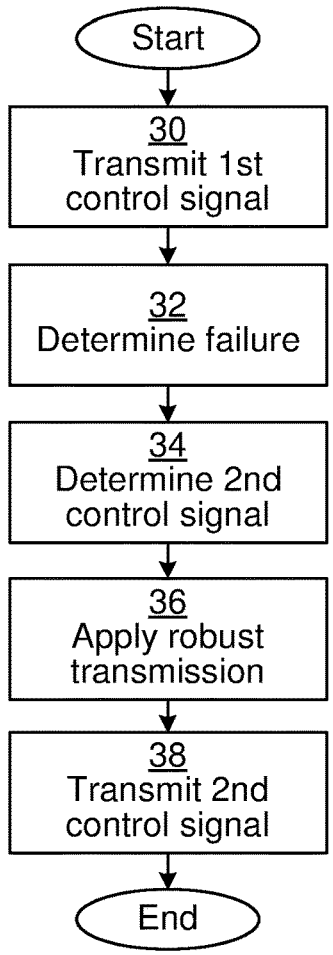
FIG. 5 is a flow chart illustrating methods performed in the network node of FIG. 1.

FIG. 5 is a flow chart illustrating methods performed in the network node of FIG. 1.

In a transmit s control signal step 30, a first control signal is transmitted to the wireless device during a receiving period for the wireless device. Optionally, the first control signal comprises an uplink resource allocation for the wireless device, sent over PDCCH. Alternatively or additionally, the first control signal can comprise a downlink resource allocation for the wireless device, sent over PDCCH. In other words, the first control signal can relate to either uplink or downlink.

In a determine failure step 32, the network node determines that a first control signal is likely to have failed to be correctly received by the wireless device. Optionally, this comprises determining an absence of a signal from the wireless device being associated with the first control signal, e.g. determining a DTX event.

In a determine $2^{nd}$ control signal step 34, the network node determines that a second control signal needs to be transmitted to the wireless device, the second control signal corresponding to the first control signal. As explained above, the second control signal can be a new resource allocation (DL assignment or UL grant) for transmitting the same payload data that was allocated using the first control signal.

In an apply robust transmission step 36, a more robust transmission procedure for the second control signal compared to a corresponding transmission procedure for the first control signal.

The more robust transmission procedure can comprise using a Control Channel Element, CCE, aggregation level which is more robust than what was used for the first control signal.

Alternatively or additionally, a more robust transmission procedure comprises using a Single Input Single Output, SISO, or Single Input Multiple Output, SIMO, transmission for the second control signal.

Alternatively or additionally, a more robust transmission comprises selecting a Downlink Control Information, DCI, format which is more robust. For instance, a DCI format 1A as defined in 3GPP TS 35.212 section 5.3.3 can be selected.

DCI will now be explained in some more detail. L1 (Level 1) signaling is done by DCI and up to eight DCIs can be configured in the PDCCH. These DCIs can have six formats: one format for UL scheduling, two formats for non-MIMO DL scheduling, one format for MIMO DL Scheduling and two formats for UL power control. DCI has various formats for the information sent to define resource allocations. Table 1 illustrates the DCI formats defined in LTE:

TABLE 1

| DCI formats in LTE | | |
|---|---|---|
| DCI Format | Usage | Major Content |
| Format 0 | UL Grant. Resource Allocation for UL Data | RB (Resource Block) Assignment, TPC (Transmitter Power Control), PUSCH (Physical Uplink Shared Channel) Hopping Flag |
| Format 1 | DL Assignment for SISO | RB Assignment, TPC, HARQ |
| Format 1A | DL Assignment for SISO (compact) | RB Assignment, TPC, HARQ |

TABLE 1-continued

DCI formats in LTE

| DCI Format | Usage | Major Content |
|---|---|---|
| Format 1B | DL Assignment for MIMO with Rank 1 | RB Assignment, TPC, HARQ, PMI (Precoding Matrix Indicator), TPMI (Transmitted PMI) |
| Format 1C | DL Assignment for SISO (minimum size) | RB Assignment |
| Format 1D | DL Assignment for Multi User MIMO | RB Assignment, TPC, HARQ, TPMI, DL Power Offset |
| Format 2 | DL Assignment for Closed Loop MIMO | RB Assignment, TPC, HARQ, Precoding Information |
| Format 2A | DL Assignment for Open Loop MIMO | RB Assignment, TPC, HARQ, Precoding Information |
| Format 2B | DL Assignment for TM8 (Dual Layer Beamforming) | RB Assignment, TPC, HARQ, Precoding Information |
| Format 2C | DL Assignment for TM9 | RB Assignment, TPC, HARQ, Precoding Information |
| Format 3 | TPC Commands for PUCCH and PUSCH with 2 bit power adjustment | Power Control Only |
| Format 3A | TPC Commands for PUCCH and PUSCH with 1 bit power adjustment | Power Control Only |
| Format 4 | UL Assignment for UL MIMO (up to 4 layers) | RB Assignment, TPC, HARQ, Precoding Information |

Figure 6:
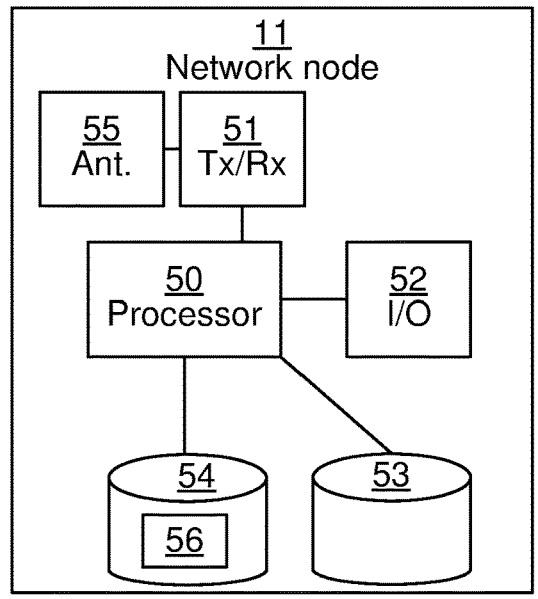
FIG. 6 is a schematic diagram illustrating some components of the network node of FIG. 1.

In a transmit $2^{nd}$ control signal step 38, the second control signal is transmitted to the wireless device. Optionally, the second control signal comprises an uplink resource allocation for the wireless device, sent over PDCCH. Optionally, the second control signal comprises a downlink resource allocation for the wireless device. Optionally, this step of transmitting (38) is only performed when the wireless device (12) is in a receiving period FIG. 6 is a schematic diagram showing some components of the network node 11 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIG. 5 above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM).

The network node 11 further comprises an I/O interface 52 for communicating with other external entities. Optionally, the I/O interface 52 also includes a user interface.

The network node 11 also comprises one or more transceivers 51, comprising analogue and digital components, and a suitable number of antennas 55 for wireless communication with wireless devices.

Other components of the network node 11 are omitted in order not to obscure the concepts presented herein.

Figure 7:
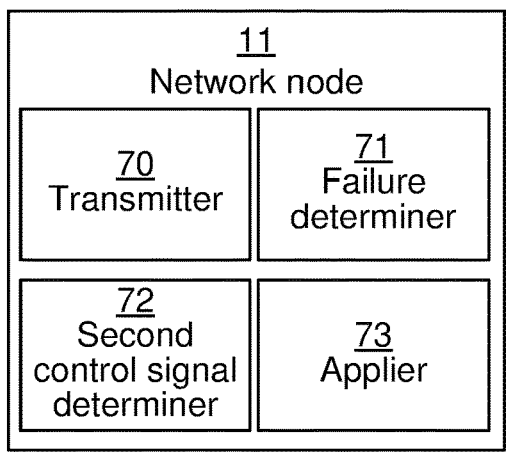
FIG. 7 is a schematic diagram showing functional modules of the network node of FIGS. 1 and 6.

FIG. 7 is a schematic diagram showing functional modules of the network node 11 of FIGS. 1 and 6. The modules can be implemented using software instructions such as a computer program executing in the network node 11 and/or using hardware, such as application specific integrated circuits, field programmable gate arrays, discrete logical components, etc. The modules correspond to the steps in the methods illustrated in FIG. 5.

A transmitter 70 corresponds to steps 30 and 38. A failure determiner 71 corresponds to step 32. A second control signal determiner 72 corresponds to step 34. An applier 73 corresponds to step 36.

Figure 8:
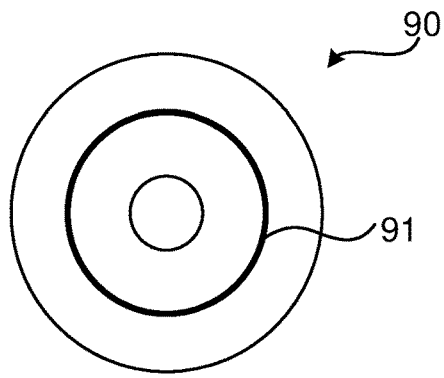
FIG. 8 shows one example of a computer program product 90 comprising computer readable means.

FIG. 8 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 6. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed in a network node of a cellular network also comprising a wireless device, the wireless device being in a discontinuous reception mode comprising receiving periods and idle periods, the method comprising the steps of:
    transmitting a first control signal to the wireless device during a receiving period for the wireless device;
    determining that the first control signal is likely to have failed to be correctly received by the wireless device;
    determining that a second control signal needs to be transmitted to the wireless device, the second control signal corresponding to the first control signal;
    applying a more robust transmission procedure for the second control signal compared to a corresponding transmission procedure for the first control signal;
    transmitting the second control signal to the wireless device; and
    wherein the step of applying a more robust transmission procedure comprises using a Single Input Single Output, SISO, or Single Input Multiple Output, SIMO, transmission and selecting a Downlink Control Information, DCI, format which is more robust for the second control signal.

2. The method according to claim 1, wherein the step of applying a more robust transmission procedure comprises using a Control Channel Element, CCE, aggregation level which is more robust.

3. The method according to claim 1, wherein each one of the first control signal and the second control signal is a downlink assignment or an uplink grant.

4. The method according to claim 1, wherein the step of applying a more robust transmission procedure comprises selecting a DCI format 1A.

5. The method according to claim 1, wherein each one of the first control signal and the second control signal is a downlink assignment.

6. The method according to claim 1, wherein the step of transmitting the second control signal is only performed when the wireless device is in a receiving period.

7. The method according to claim 1, wherein the step of determining that the first control signal is likely to have failed to be correctly received by the wireless device comprises determining an absence of a signal from the wireless device being associated with the first control signal.

8. A network node configured to form part of a cellular network also comprising a wireless device, the wireless device being in a discontinuous reception mode comprising receiving periods and idle periods, the network node comprising:
a processor; and
a memory storing instructions that, when executed by the processor, causes the network node to:
transmit a first control signal to the wireless device during a receiving period for the wireless device;
determine that the first control signal is likely to have failed to be correctly received by the wireless device;
determine that a second control signal needs to be transmitted to the wireless device, the second control signal corresponding to the first control signal;
apply a more robust transmission procedure for the second control signal compared to a corresponding transmission procedure for the first control signal;
transmit the second control signal to the wireless device; and
wherein the instructions to apply a more robust transmission procedure comprise instructions that, when executed by the processor, causes the network node to use a Single Input Single Output, SISO, or Single Input Multiple Output, SIMO, transmission and select a Downlink Control Information, DCI, format which is more robust for the second control signal.

9. The network node according to claim 8, wherein the instructions to apply a more robust transmission procedure comprise instructions that, when executed by the processor, causes the network node to use a Control Channel Element, CCE, aggregation level which is more robust.

10. The network node according to claim 8, wherein each one of the first control signal and the second control signal is a downlink assignment or an uplink grant.

11. The network node according to claim 8, wherein the instructions to apply a more robust transmission procedure comprise instructions that, when executed by the processor, causes the network node to select a DCI format 1A.

12. The network node according to claim 8, wherein each one of the first control signal and the second control signal is a downlink assignment.

13. The network node according to claim 8, wherein the instructions to transmit the second control signal are only performed when the wireless device is in a receiving period.

14. The network node according to claim 8, wherein the instructions to determine that the first control signal is likely to have failed to be correctly received by the wireless device comprise instructions that, when executed by the processor, causes the network node to determine an absence of a signal from the wireless device being associated with the first control signal.

15. A network node comprising:
means for transmitting a first control signal to the wireless device during a receiving period for the wireless device, the wireless device forming part of a cellular network also comprising the network node, the wireless device being in a discontinuous reception mode comprising receiving periods and idle periods;
means for determining that the first control signal is likely to have failed to be correctly received by the wireless device;
means for determining that a second control signal needs to be transmitted to the wireless device, the second control signal corresponding to the first control signal;
means for applying a more robust transmission procedure for the second control signal compared to a corresponding transmission procedure for the first control signal;
means for transmitting the second control signal to the wireless device; and
wherein means for applying a more robust transmission procedure comprises means for using a Single Input Single Output, SISO, or Single Input Multiple Output, SIMO, transmission and means for selecting a Downlink Control Information, DCI, format which is more robust for the second control signal.

16. A computer program comprising computer program code stored on a non-transitory medium which, when run on a network node configured to form part of a cellular network also comprising a wireless device, the wireless device being in a discontinuous reception mode comprising receiving periods and idle periods, causes the network node to:
transmit a first control signal to the wireless device during a receiving period for the wireless device;
determine that the first control signal is likely to have failed to be correctly received by the wireless device;
determine that a second control signal needs to be transmitted to the wireless device, the second control signal corresponding to the first control signal;
apply a more robust transmission procedure for the second control signal compared to a corresponding transmission procedure for the first control signal;
transmit the second control signal to the wireless device; and
wherein program code causing the network node to apply a more robust transmission procedure comprises program code causing the network node to use a Single Input Single Output, SISO, or Single Input Multiple Output, SIMO, transmission and to select a Downlink Control Information, DCI, format which is more robust for the second control signal.

17. A computer program product comprising a computer program stored on a non-transitory medium according to claim 16 and a computer readable means on which the computer program is stored.

* * * * *